United States Patent
Patterson et al.

(10) Patent No.: US 8,291,637 B2
(45) Date of Patent: Oct. 23, 2012

(54) RODENT TRAP INCLUDING PRESENCE INDICATOR MECHANISM

(75) Inventors: Cecil E. Patterson, Jackson, GA (US); James Smith, Jackson, GA (US)

(73) Assignee: B&G Equipment Company, Jackson, GA (US)

( * ) Notice: Subject to any disclaimer, the term of this patent is extended or adjusted under 35 U.S.C. 154(b) by 191 days.

(21) Appl. No.: 12/857,132

(22) Filed: Aug. 16, 2010

(65) Prior Publication Data

US 2011/0072709 A1 Mar. 31, 2011

Related U.S. Application Data

(60) Provisional application No. 61/245,753, filed on Sep. 25, 2009.

(51) Int. Cl.
*A01M 23/30* (2006.01)
*A01M 23/00* (2006.01)
*A01M 23/16* (2006.01)
*A01M 23/24* (2006.01)

(52) U.S. Cl. .......................................................... 43/81
(58) Field of Classification Search ............. 43/81, 8.15, 43/82, 83, 83.5, 88–96, 81.5
See application file for complete search history.

(56) References Cited

U.S. PATENT DOCUMENTS

| | | | | |
|---|---|---|---|---|
| 2,638,700 A * | 5/1953 | Nantt | ............................. | 43/80 |
| 3,778,923 A | 12/1973 | Cuoco | ............................. | 43/69 |
| 4,393,616 A | 7/1983 | Kaufman et al. | ................. | 43/60 |
| 5,148,624 A * | 9/1992 | Schmidt | ............................. | 43/81 |
| 5,172,512 A * | 12/1992 | Bodker et al. | .................... | 43/81 |
| 5,267,411 A | 12/1993 | Phillips et al. | .................... | 43/81 |
| 6,016,623 A | 1/2000 | Celestine | ............................ | 43/61 |
| 6,137,415 A | 10/2000 | Rast | ............................ | 340/573.2 |
| RE40,884 E * | 9/2009 | Masterson | ........................ | 43/121 |
| 7,980,023 B2 * | 7/2011 | Nelson et al. | ..................... | 43/67 |
| 2003/0110679 A1 | 6/2003 | Collins | ................................ | 43/81 |
| 2004/0025410 A1 * | 2/2004 | Shapland | ........................... | 43/65 |
| 2008/0196295 A1 | 8/2008 | Oliver | ................................ | 43/98 |
| 2009/0151221 A1 | 6/2009 | Daley | ................................ | 43/58 |

* cited by examiner

*Primary Examiner* — Darren W Ark
*Assistant Examiner* — Timothy Schwarz
(74) *Attorney, Agent, or Firm* — DLA Piper LLP (US)

(57) ABSTRACT

A rodent station includes a base with an entrance point and an exit point to allow a rodent to access the station. A hinged cover may be coupled to the base for housing an indicator device. The indicator device may be configured to show an operator that activity, such as capturing a rodent, has occurred within the rodent station. A killing device may be disposed in the base and configured to activate the indicator device upon being triggered by a rodent. The killing device may include an arm that rotates when triggered by the rodent. In one exemplary embodiment, a portion of the arm may contact a portion of the indicator device, resulting in an alert portion protruding from the cover of the rodent station, thereby indicating the triggering of the killing device. The indicator device may be, for example, a spring-loaded pop-up device or a rotating flag device.

19 Claims, 17 Drawing Sheets

RODENT TRAP INCLUDING PRESENCE INDICATOR MECHANISM

CROSS-REFERENCE TO RELATED APPLICATIONS

This application claims priority to U.S. Provisional Patent Application No. 61/245,753, entitled "Rodent Trap Including Presence Indicator Mechanism," filed on Sep. 25, 2009, the entire contents of which are incorporated by reference, as if fully set forth herein.

TECHNICAL FIELD

The disclosure relates generally to a rodent trap, and more particularly to a rodent trap with a visible presence indicator. The presence indicator allows an operator to determine whether there is a rodent within the trap or the trap has been triggered without physical inspection.

BACKGROUND

For years, there have been many different ways for a Pest Control Operator (PCO) to control rodents in either a home or commercial environment. Two of the most common ways are: (1) the use of a chemical rodenticide inside of a reusable plastic device (i.e., trap), and (2) use of a spring-loaded mechanical killing device commonly called a "snap trap." With rodenticides, typically a rodent will ingest the chemical, leave the reusable plastic device and die somewhere in the surrounding area. While this is effective for outside control, when controlling rodents on the interior of structures, the PCO is faced with the problem of finding, and disposing of, the dead rodent. In applications where this could be a problem, the best choice for control would be placement of "snap traps" around the area. Many times attractants (such as a food-based attractant) are added to the activation area of the trap to help lure the rodent to the trap. The rodent will then activate the snap trap and the spring-loaded "killing device" will serve a dual purpose, one to kill the rodent and the other to keep the rodent in the device for easy disposal. This method, while effective, also has drawbacks as it exposes the dead rodent to people in the surrounding area of the trap. This can be especially unpleasant in an environment such as a restaurant. It has become commonplace in areas such as this to place this mechanical killing device into a reusable plastic device, typically a housing that was designed for a rodenticide application, so as to conceal the dead rodent until the point that it can be disposed of. In addition, because of the toxicity of rodenticides and the danger to the environment and possible poisoning of other animals, it is becoming common to use the mechanical killing device in place of the rodenticides.

When using a snap trap inside of a plastic device (which will be referred to hereafter as a "snap trap station"), typically the housing would have a base and cover. The cover would be hinged and locks into the base to prevent tampering with the snap trap. To service, the PCO would place a specially designed key into the base, unlock the cover and rotate the cover back from the base. This would allow for the servicing of the mechanical killing device.

One problem that occurs when using a snap trap station is the amount of time that is necessary in unlocking each station and checking inside to see if there has been any rodent activity. While in an application where only one station in placed, this may not be an issue, but in a large area of control such as a food processing plant where possibly hundreds of stations are placed, this could be a very time consuming process to check each station.

Accordingly, there is presently a need for a rodent trap which is both inconspicuous and attractive to rodents, and which provides an accurate and visible presence indicator.

SUMMARY

A rodent station according to an exemplary embodiment includes a base including an entrance point and an exit point, a hinged cover coupled to the base, an indicator device housed within a portion of the cover, and a killing device removably disposed within the base, the killing device including an arm which, when triggered, activates the indicator device.

According to another exemplary embodiment, a rodent station includes a base comprising an entrance point and an exit point, a cover coupled to the base, a spring-loaded indicator device housed within a portion of the cover, wherein the indicator device includes a contact member and an alert portion, and a spring-loaded killing device removably disposed in the base and including a rotating arm which, when triggered, activates the spring-loaded indicator device, wherein activation of the spring-loaded indicator device causes the alert portion of the indicator device to extend outwardly from the cover.

According to a further exemplary embodiment, a method for monitoring rodent activity is described, which includes the steps of disposing a rodent trap including at least one killing device and at least one indicator device in a rodent-infested area, periodically observing the indicator device to determine if rodent activity has occurred within the killing device of the rodent trap, continuing to observe the indicator device if the indicator device is disposed in a first position; and, checking the rodent device for rodent activity if the indicator device is disposed in a second position.

BRIEF DESCRIPTION OF THE DRAWINGS

The invention will be better understood with reference to the following detailed description, of which the following drawings form an integral part.

DETAILED DESCRIPTION

Figure 1:
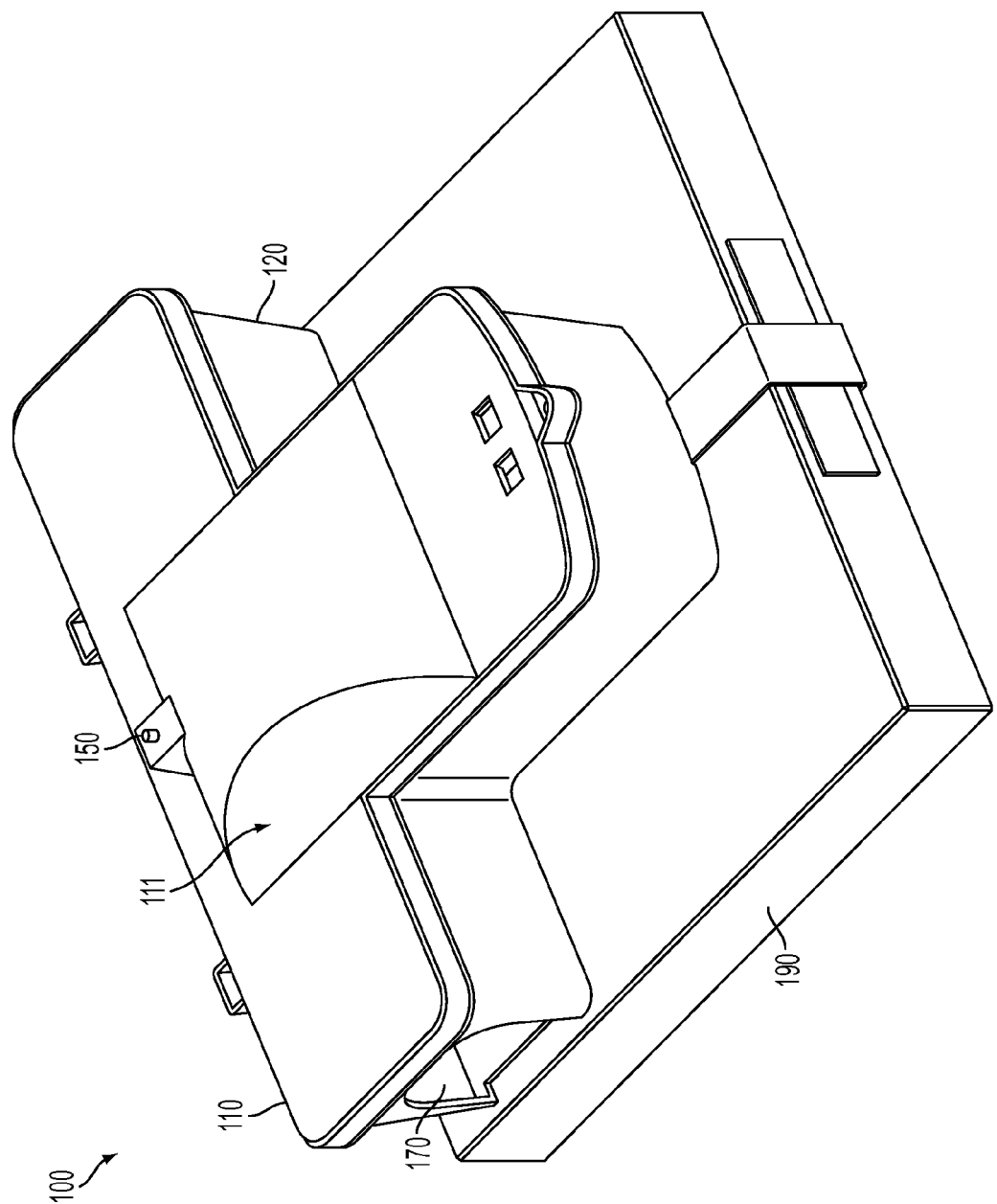
FIG. 1 is perspective view of a rodent station according to an exemplary embodiment.
Figure 2:
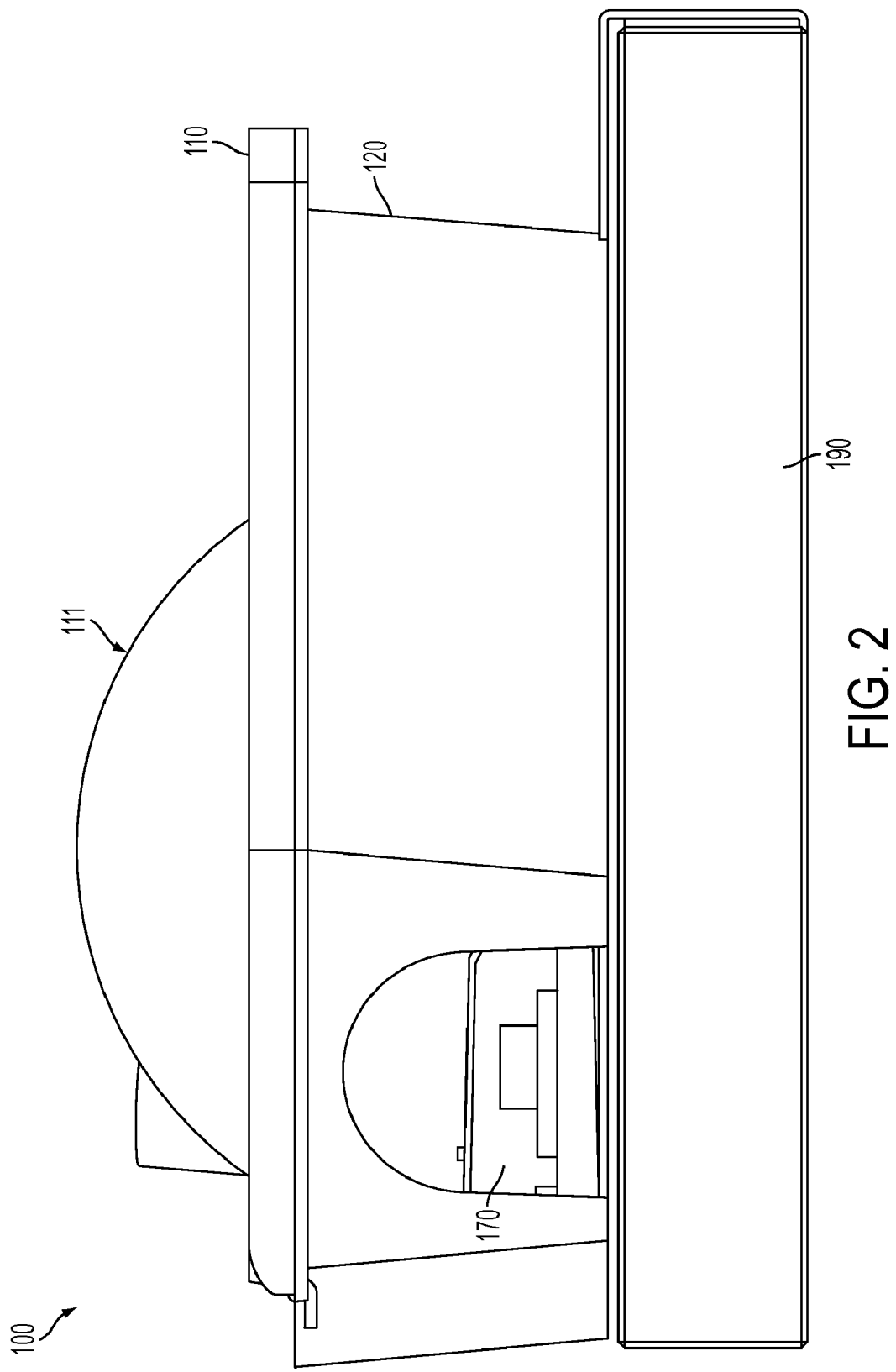
FIG. 2 is left side elevation view of the rodent station of FIG. 1.
Figure 3:
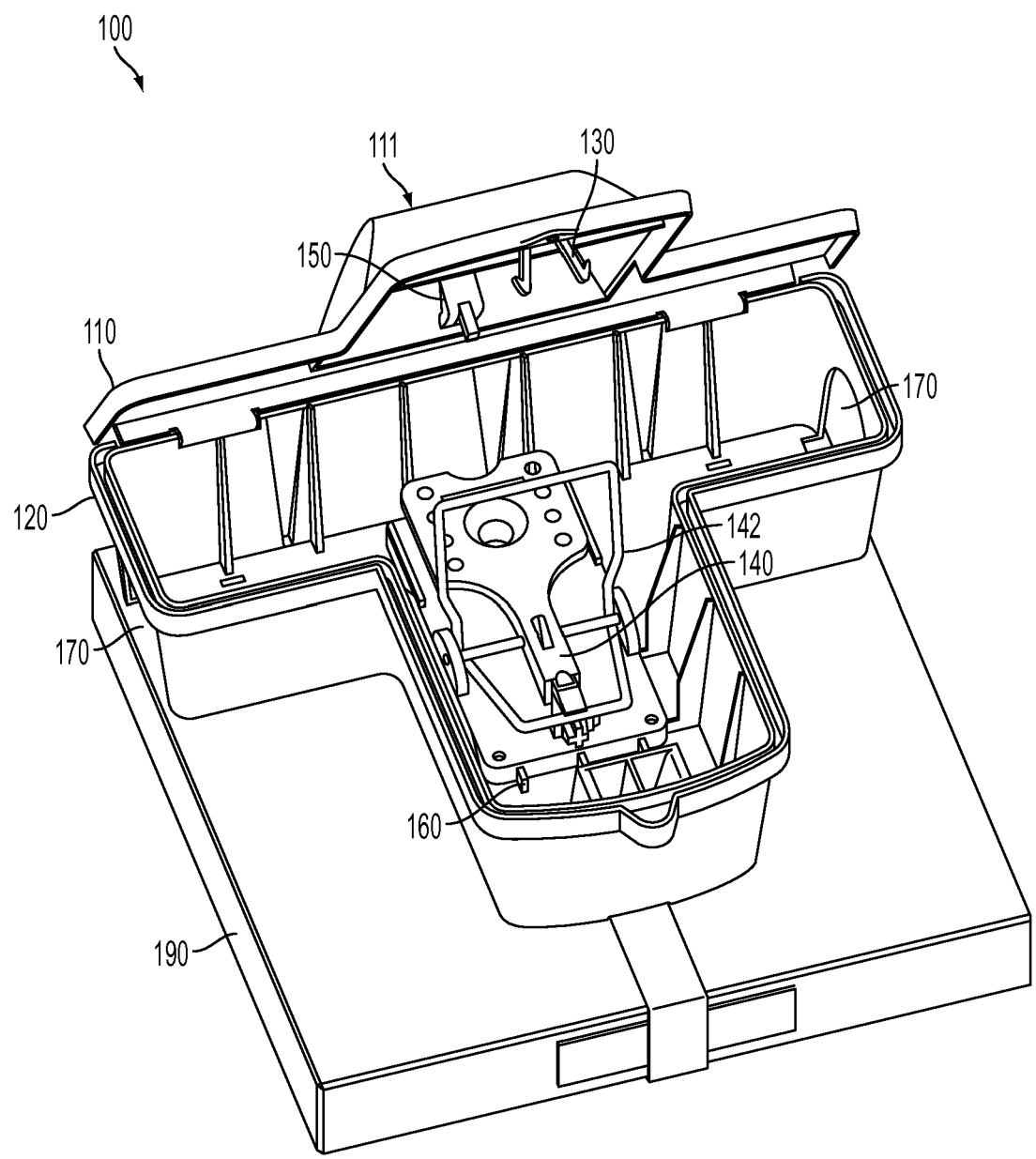
FIG. 3 is a perspective view of the rodent station of FIG. 1, with the cover partially open.
Figure 4:
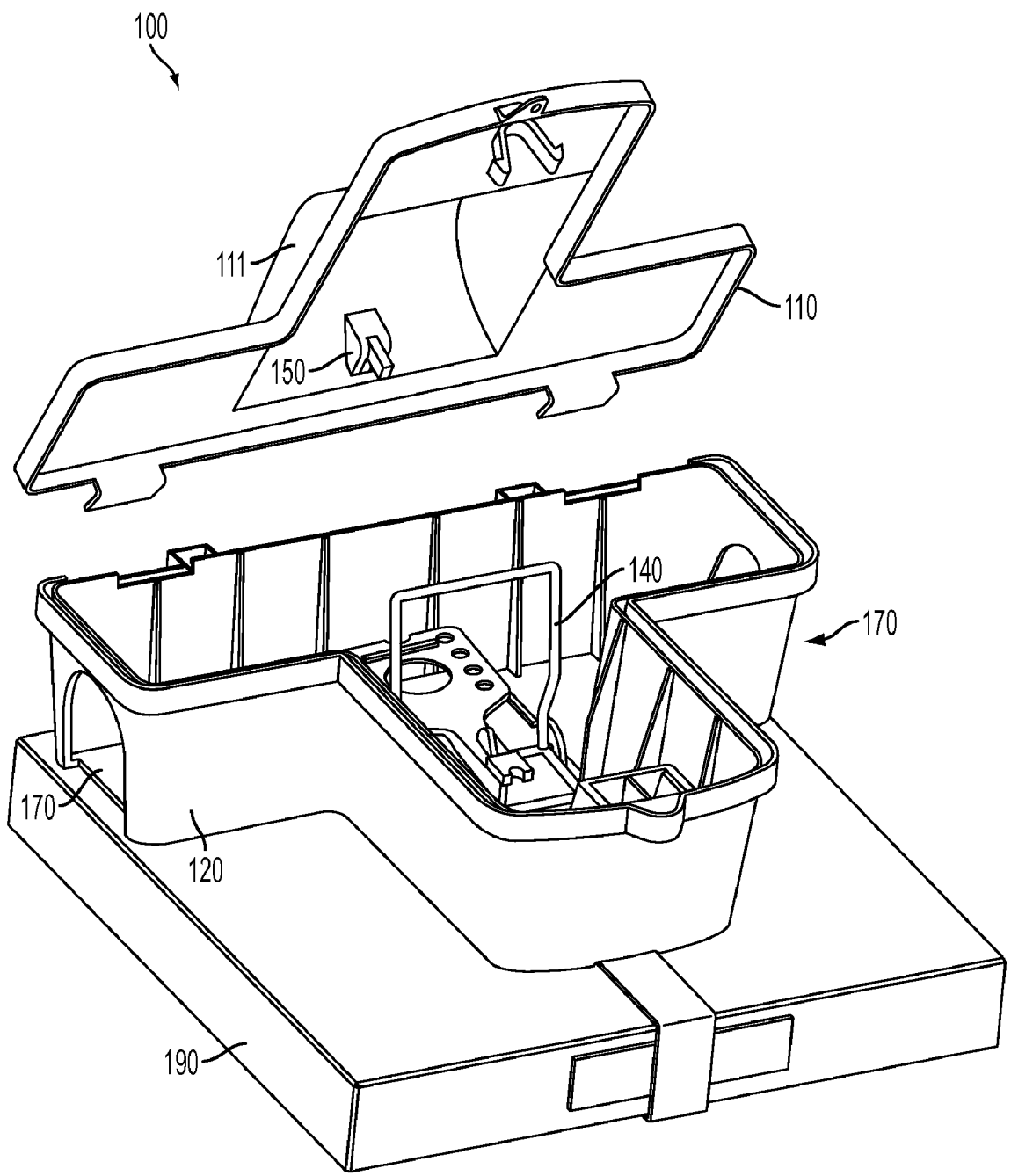
FIG. 4 is, a partially exploded perspective view of the rodent station of FIG. 1, showing the cover removed.

The present disclosure relates to a rodent trap including a presence indicator mechanism which operates to alert an operator of the trap to the presence of a rodent activity inside the trap. The rodent trap may be placed in a "rodent-infested area" by a PCO, wherein "rodent-infested area" is defined as an area having one or more rodents.

One benefit of the rodent trap is that it comprises a rodent station with a defined entrance point and exit point. It has been proven that there will be increased rodent activity if an exit point can be visible to the rodent. In addition, having at least two openings in the trap allows, the rodent to enter from either side of the station. Some conventional snap trap stations have no exit point visible to the rodent, and thus do not effectively attract rodents. For example, U.S. Pat. No. 5,267,411 discloses a rodent trap with a single ingress/egress. In addition, it has been proven that the lower the profile and height of the station the more rodent activity will be present. Thus, the rodent trap of the present disclosure comprises a low profile station. Another benefit of the rodent trap of the present disclosure is reusability. Many conventional rodent stations (such as the '411 patent mentioned above) are designed for a single use (i.e., once they are used to trap a single rodent, they are discarded with the rodent body). Obviously, reusability is a key element in today's pest control industry, as it provides reduced waste. Hence, the present rodent trap comprises a reusable rodent station.

According to an exemplary embodiment, and as illustrated in FIGS. 1-4, a rodent station 100 is comprised of a hinged cover 110 which is coupled to a base 120. The rodent station 100 may also include a means 130 of locking the cover 110 to the base 120 (e.g., locking mechanism), a mechanical killing device 140 (e.g., snap trap), and an indicator device 150 to show that rodent activity has occurred. The base 120 of the station 100 may also include locating tabs 160 to position the killing device 140 within the rodent station 100. The rodent station 100 may also include clearly defined entrance and exit points 170, which are visible to the rodent. Again, these points provide an attractant to the rodent while allowing the rodent to enter the station 100 from either side. The cover 110 may provide a low profile design which conceals the killing device 140 from view of the rodent. According to an exemplary embodiment, and as shown in FIGS. 1-4, the cover 110 may include a substantially dome-shaped portion 111. The purpose of this dome-shaped portion 111 is to house the indicator device 150, and to allow the "swing" of an arm 142 of the killing device 140 to activate the indicator device 150 when the snap trap is triggered. Those of ordinary skill in the art will realize that the cover 110 need not include a dome-shaped portion 111, and that the cover 110 may include an extending portion that may be in the form of a variety of other shapes, such as a cube-shaped portion. Moreover, the cover 110 need not include an extending portion and may instead be of sufficient height to allow the "swing" of the arm 142 of the killing device 140 to activate the indicator device 150 when the snap trap is triggered.

Figure 11:
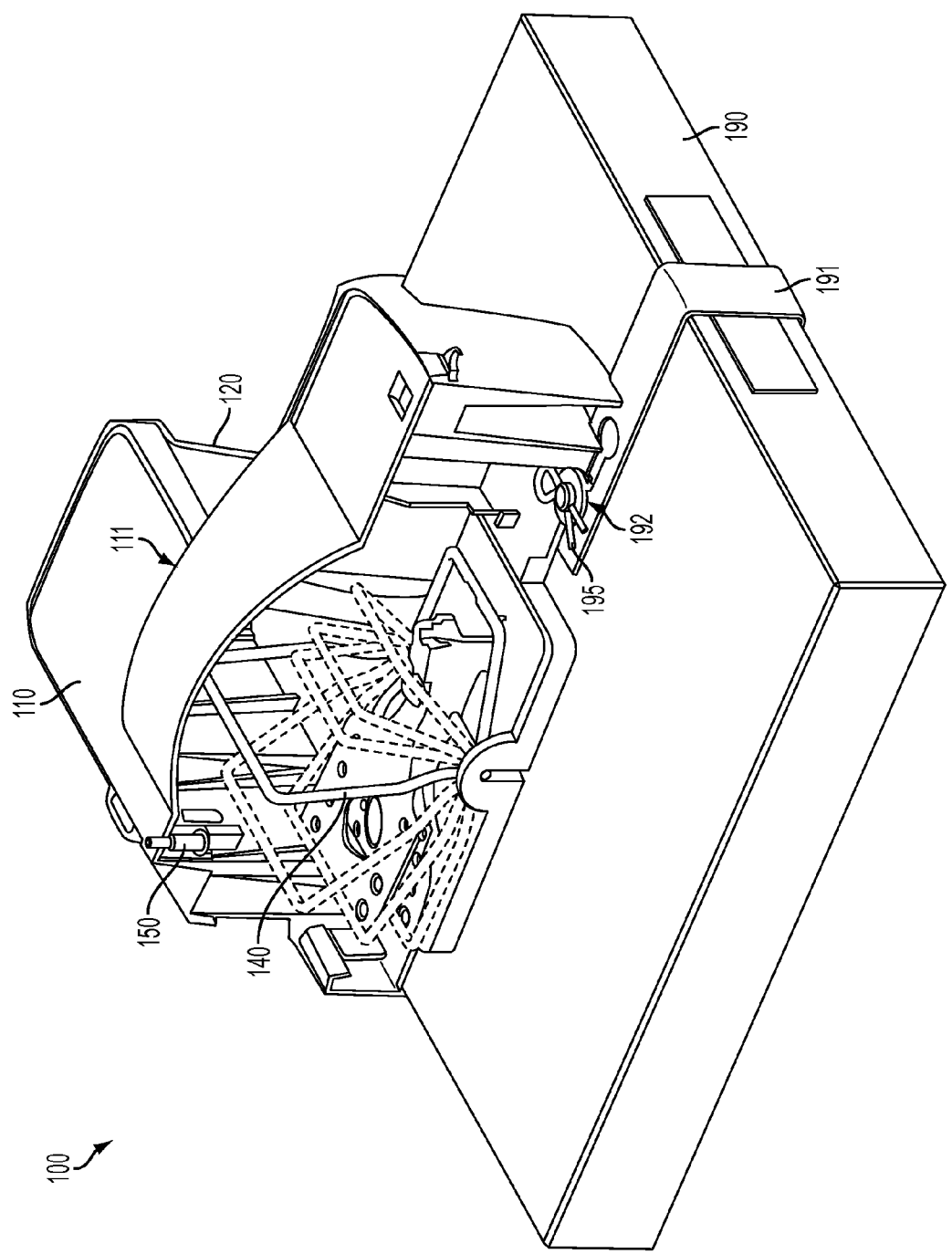
FIG. 11 is a partial cross-section perspective view of the rodent station of FIG. 1, showing various positions of an arm of a killing device.
Figure 12:
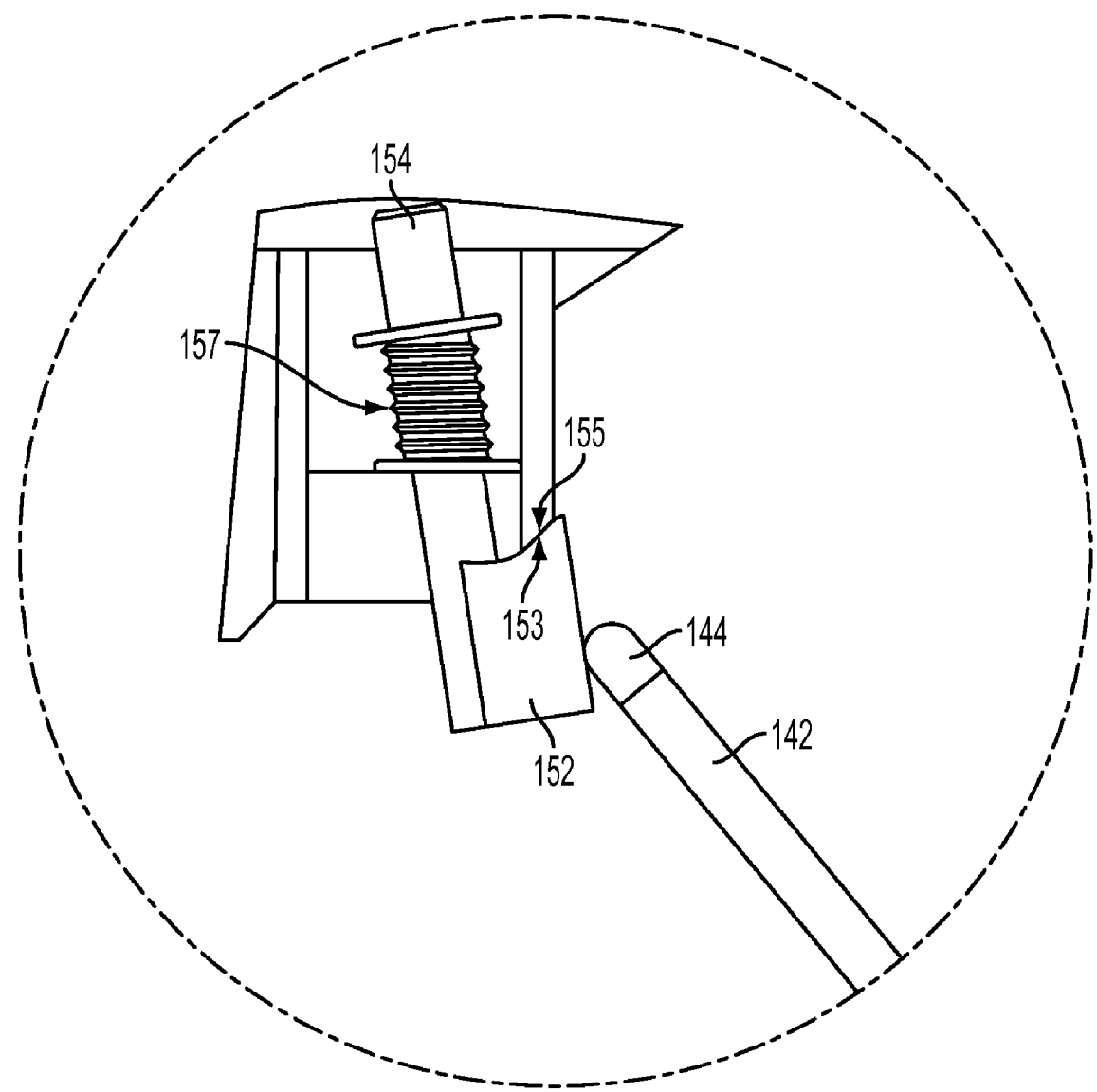
FIG. 12 is a detail side elevation view of the rodent station of FIG. 9b.
Figure 13:
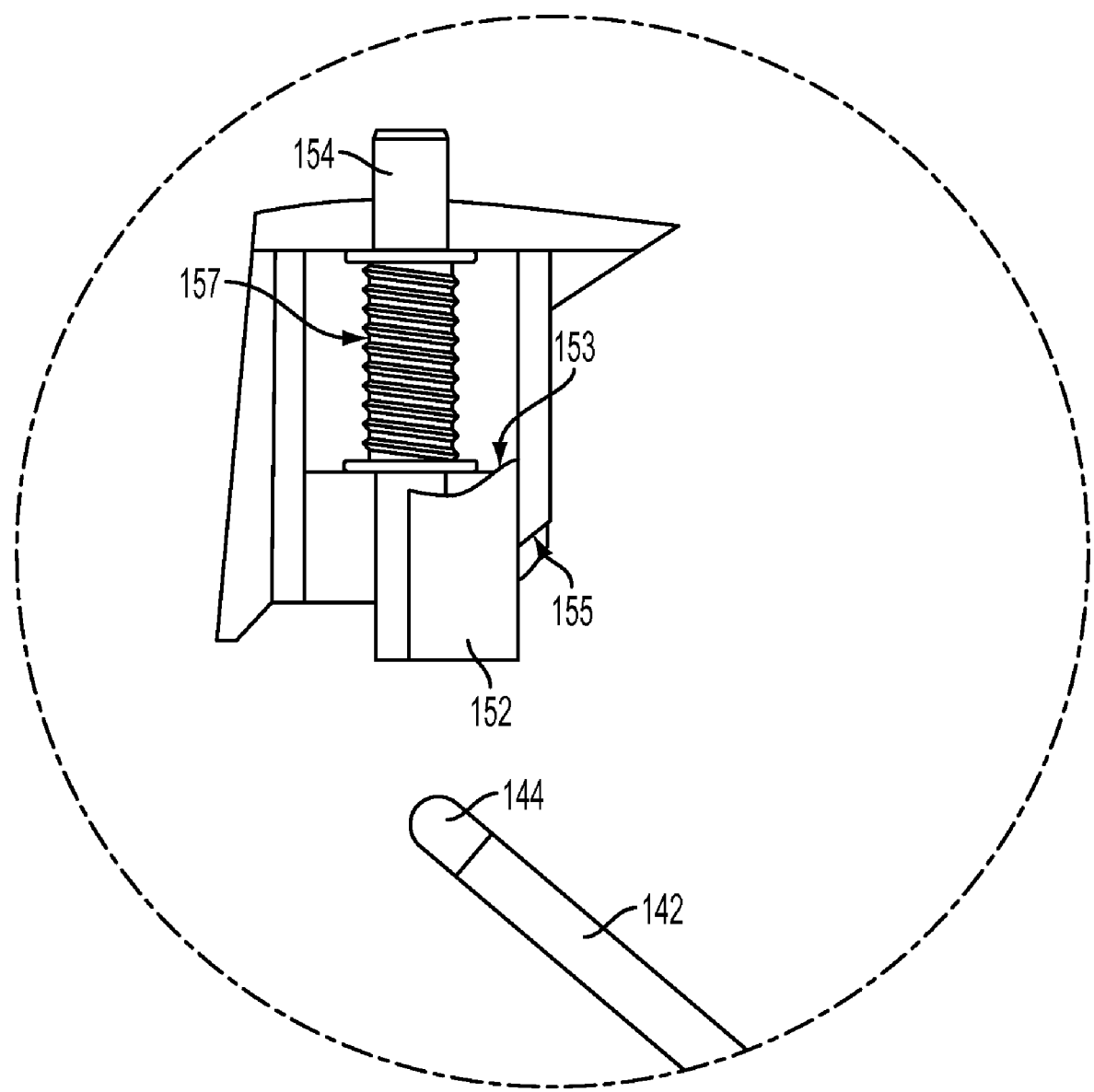
FIG. 13 is a detail side elevation view of the rodent station of FIG. 10b.

The rodent station 100 may be coupled to a substantially stationary member 190, such as a cinder block, a paver, or a floor. For example, FIG. 11 shows an exemplary embodiment where a clamp 191 is secured to the substantially stationary member 190, where the clamp includes a protruding member 192 which extends through a corresponding opening in the floor of the rodent station 100. A cotter pin 195 or equivalent device is then used to secure the rodent trap 100 to the clamp 191. Although the figures show a killing device 140 with an arm 142 that swings, such as by rotating through an arc of between 120-180 degrees, to perform the killing "swing," those of ordinary skill in the art will realize that various killing devices may be used with the rodent station. For example, some snap traps do not include a swinging arm per se, but rather use a clamp mechanism (like a bear trap). Those of ordinary skill in the art will realize that such snap traps may be used in place of the killing device shown in the figures without departing from the scope of the present disclosure. Those of ordinary skill in the art will also realize how to modify the indicator device 150 to work with such alternative snap traps. For example, the snapping action of the clamp may be used to activate the indicator device 150.

Figure 5:
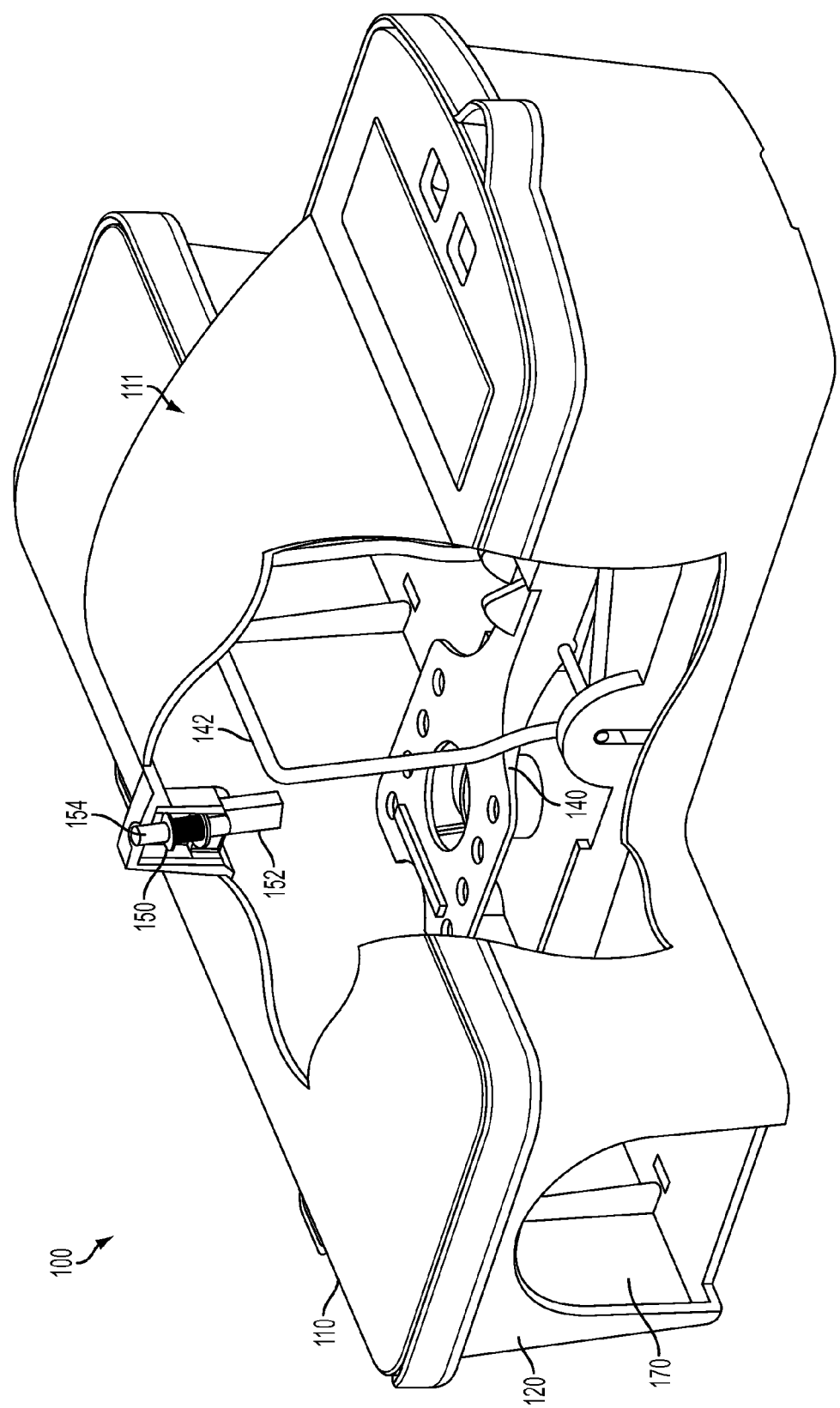
FIG. 5 is a perspective view of the rodent station of FIG. 1, showing an arm of a killing device in a first (un-activated) position.
Figure 6:
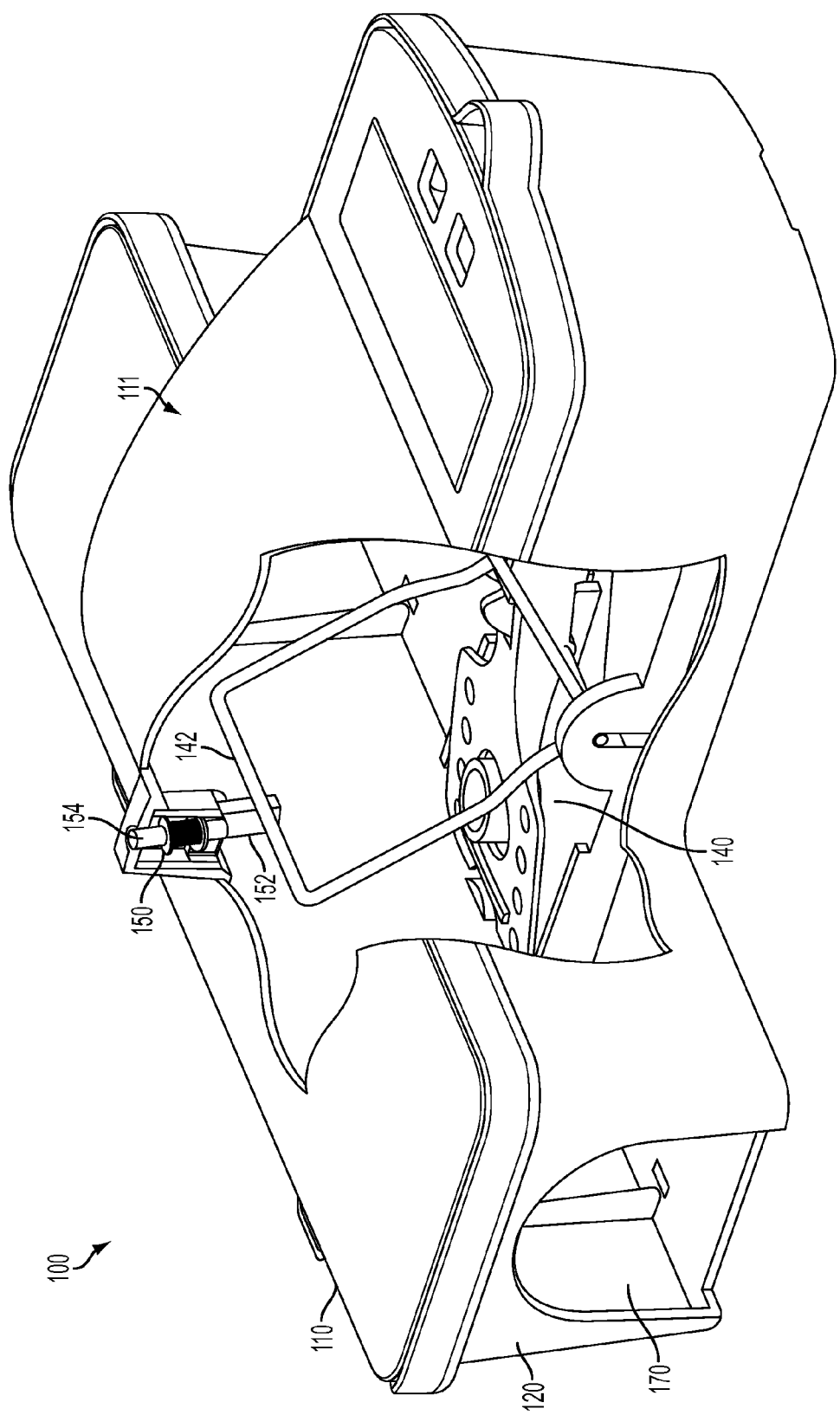
FIG. 6 is a perspective view of the rodent station of FIG. 1, showing an arm of a killing device in a second (partially activated) position.
Figure 7:
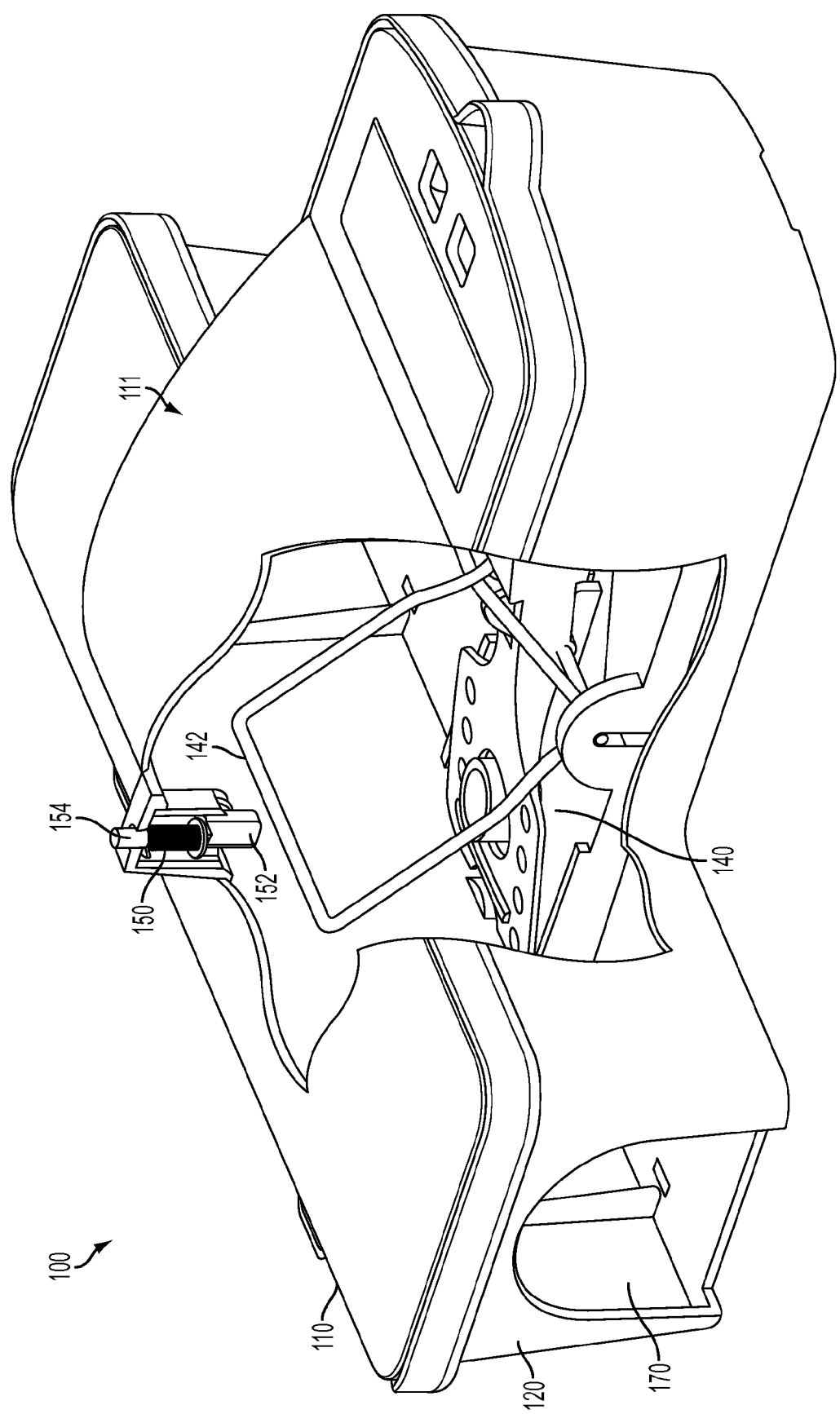
FIG. 7 is a perspective view of the rodent station of FIG. 1, showing an arm of a killing device in a third (partially activated) position.
Figure 8:
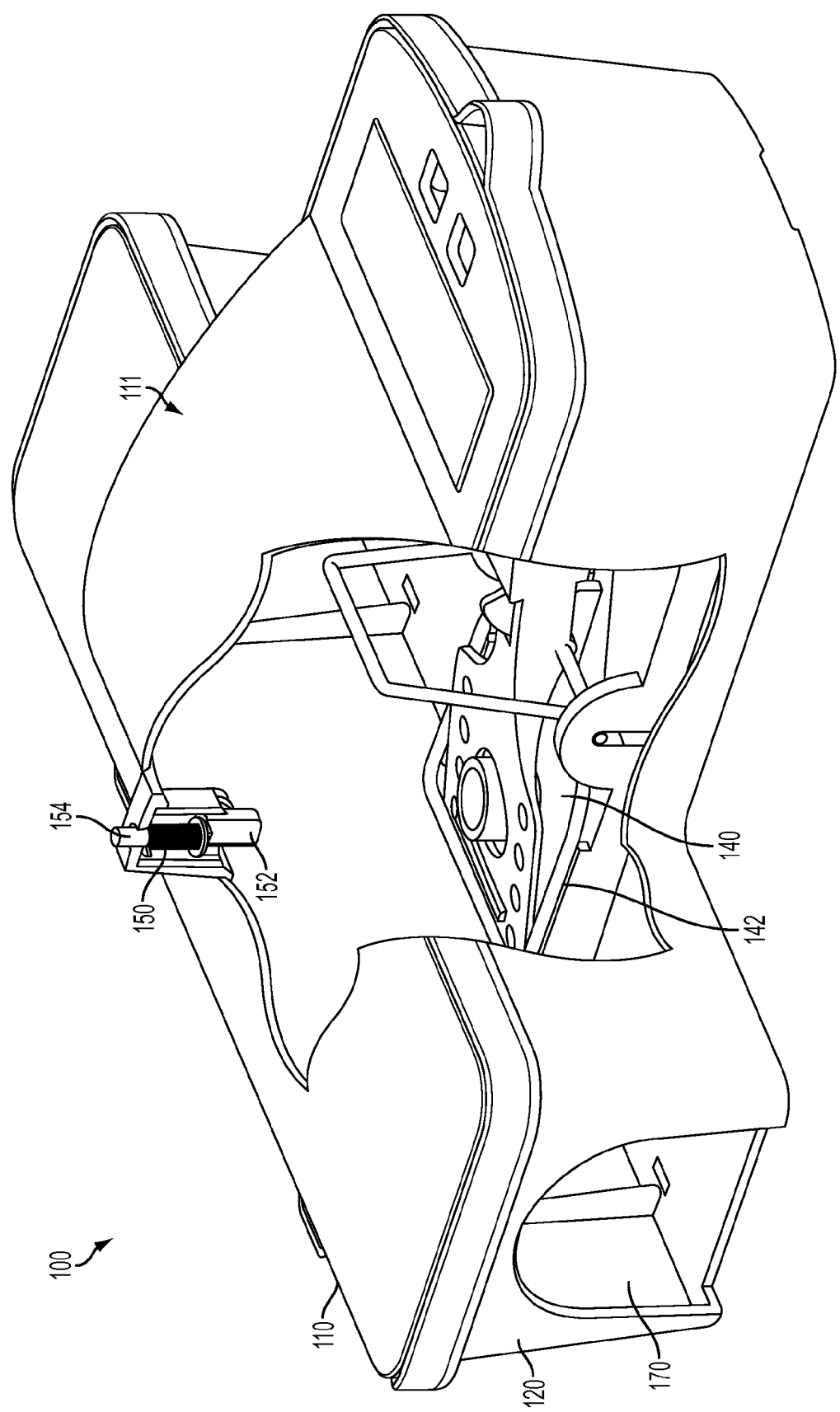
FIG. 8 is a perspective view of the rodent station of FIG. 1, showing an arm of a killing device in a fourth (fully activated) position.

The rodent station operates as follows, as shown with respect to FIGS. 5-10c. FIGS. 5-8 provide cut-away views of the rodent station 100, while FIGS. 9a-10c provide perspective views of the killing device 140 and the indicator device 150. When the rodent enters the station 100, it will trigger the killing device 140, which may be spring-loaded. In particular, the killing device 140 will release an arm 142 which moves from one side of the killing device 140 to the other, as is known to those of ordinary skill in the art. The movement of the arm 142 of the killing device 140 may trigger the indicator device 150. The indicator device 150 may comprise a spring-loaded pop-up type design, a rotating flag design, or any other equivalent indicator device known to those of ordinary skill in the art. When a PCO views the station 100 from the outside, an alert portion 154 of the indicator device 150 is visible, which tells the PCO that there has been activity inside the station 100. If so, he can then service the station accordingly. FIG. 5 illustrates the arm 142 of the killing device 140 in a first (un-activated) position. At this point, the killing device 140 has not been triggered. FIG. 6 and FIG. 7 respectively show the arm 142 in a second and third (partially activated) positions. At these points, the killing device 140 has been triggered, and the arm 142 is accordingly rotating. FIG. 7 shows the arm 142 in a fourth (fully activated) position.

Referring now to FIGS. 9a-10c, the indicator device 150 may include a contact member 152 which is adapted to interact with a contact portion 144 of the killing device 140. For example, as shown in the FIGS. 9a-10c, the indicator device 150 may include a contact member 152 which is contacted by a substantially U-shaped contact portion 144 of the arm 142 of the killing device 140. Thus, as the killing device 140 is triggered, the movement of the arm 142 of the killing, device 140 activates the indicator device 150. As noted above, the indicator device 150 may comprise a spring-loaded pop-up type design, a rotating flag design, or any other equivalent indicator device known to those of ordinary skill in the art. It will be noted that the indicator device 150 and the killing device 140 comprise separate structures which are disposed apart from one another. Such a design substantially prevents actuation of the killing device 140 from the outside of the rodent station 100, such as by moving or hitting the indicator device 150. Conventional snap traps with indicators (such as the '411 patent mentioned above) include indicators which are integral with the snap trap, which can cause the above-referenced inadvertent actuation of the killing device.

As discussed above, the indicator device 150 may be, according to an exemplary embodiment, located within a dome-shaped portion 111 of a cover 110 of the rodent station 100, so as to maintain a low profile design. Such a configuration also allows the arm 142 of the killing device 140 to travel inside and follow the path of the dome-shaped portion 111 to activate the indicator device 150. The dome-shaped portion 111 also helps to conceal the indicator device 150 from the rodent's view. According to another exemplary embodiment, the cover 110 may include an extending portion in an alternative shape that also allows for the arm 142 of the killing device 140 to travel inside the cover 110 while also being concealed from the rodent's view. According to yet another exemplary embodiment, the indicator device 150 may be located within a top portion of the cover 110, where the cover 110 is of sufficient height to allow for the arm 142 of the killing device 140 to travel inside the cover 110 while also being concealed. Those of ordinary skill in the art will realize that the indicator device 150 as described above is capable of being easily reset and reusable.

As shown in FIGS. 9a-10c, the indicator device 150 may include an alert portion 154 which is disposed within the rodent station 100 before the killing device 140 is activated, and disposed outside the rodent station 100 thereafter. Some conventional snap traps (such as the '411 patent discussed above) include indicators which are initially disposed outside of the trap, and which are drawn inside the trap upon activation of the associated killing device. However, such conventional traps often provide 'false' detections to the PCO because the rodent has either chewed (or otherwise destroyed) the portion of the indicator which lies outside the trap, or because the rodent has chewed (or otherwise destroyed) the connection between the indicator and the killing device from inside the trap. By making the alert portion 154 of the indicator device 150 extend outwardly from the rodent station 100 in the exemplary embodiment, accurate detection is substantially guaranteed. Further, by disposing the alert portion 154 initially inside the rodent station 100, the exemplary rodent station 100 substantially prevents liquid from outside the station 100 (such as from rain) getting inside the station 100 (as the flag portion 154 substantially blocks such liquid). As shown in the figures, the alert portion 154 of the indicator device may be of a rectangular shape, so as to prevent rotation of the alert portion 154 and thus the remainder of the indicator device 150 within the cover of the rodent station 100. For example, if the alert portion 154 were round in cross-section, any rotation of the flag portion 154 might cause corresponding movement of the contact member 152 of the indicator device 150, which might prevent the contact portion 144 of the killing device 140 from making contact therewith.

As shown in the figures, for example FIGS. 5-8, the indicator device 150 may be housed in a portion of the cover 110. The indicator device 150 may also be made removable from such portion of the cover 110, thereby allowing defective or inoperative indicator devices 150 to be replaced without replacing the entire rodent station 100. For example, the indicator device 150 may be press-fit or friction-fit into the cover 110 of the rodent station 100. As discussed above, a contact member 152 of the indicator device 150 that protrudes inside the cover 110 may act as the 'trigger' mechanism for the indicator device 150. The contact member 152 of the indicator device 150 may be disposed within the interior of the rodent station 100, so as not to be inadvertently activated by external forces. For example, the contact member 152 may comprise a mechanical switch disposed inside the rodent station 100, which when moved horizontally displaces a retention mechanism for a spring. Thus, when the retention mechanism is displaced, the spring expands causing the alert portion 154 of the indicator device 150 to become disposed outside the rodent station 100 (where it will be visible to the PCO).

Figure 9A:
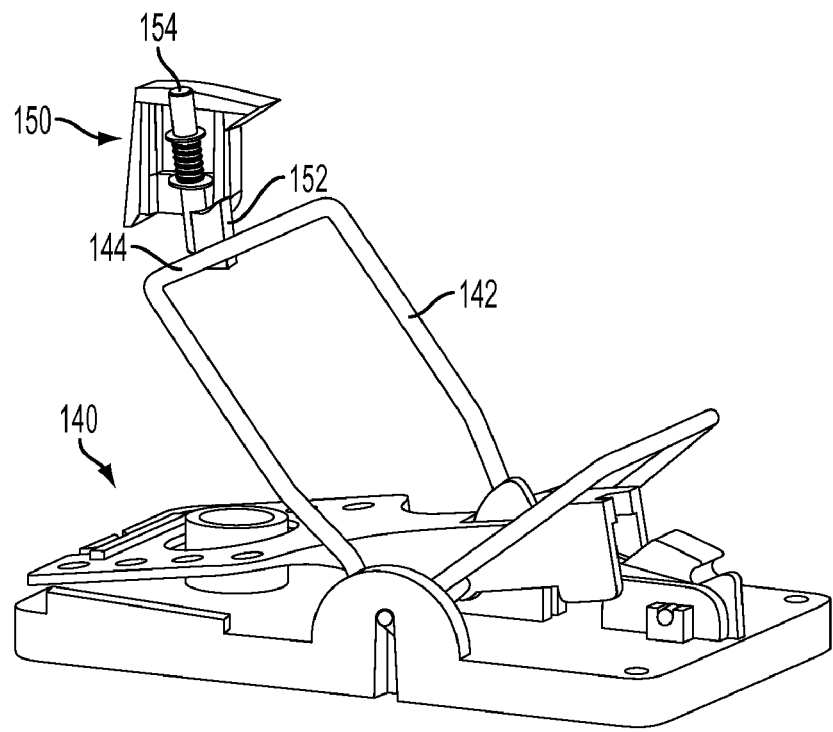
FIGS. 9a-9c are side elevation and perspective views of the rodent station of FIG. 1, showing an arm of a killing device in a second (partially activated) position.
Figure 9B:
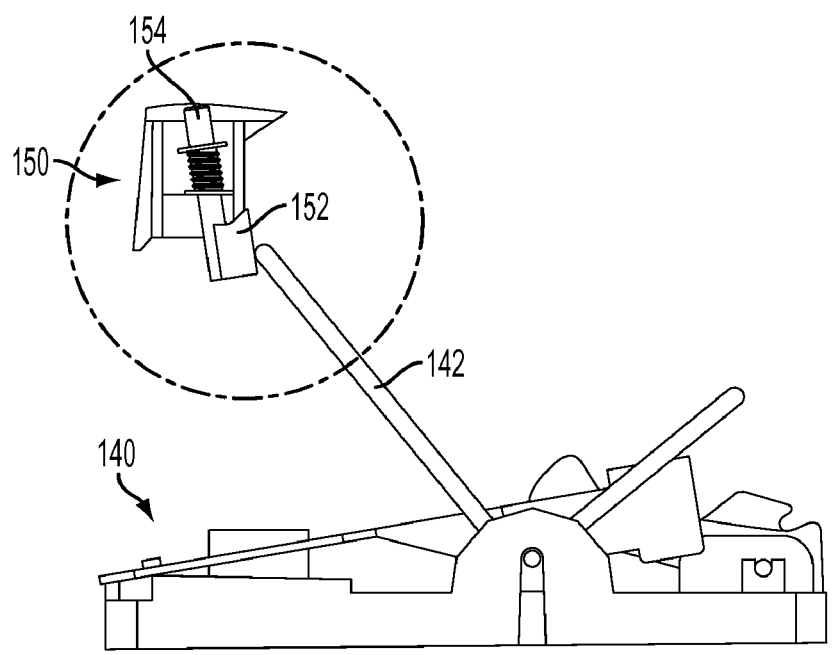
Figure 9C:
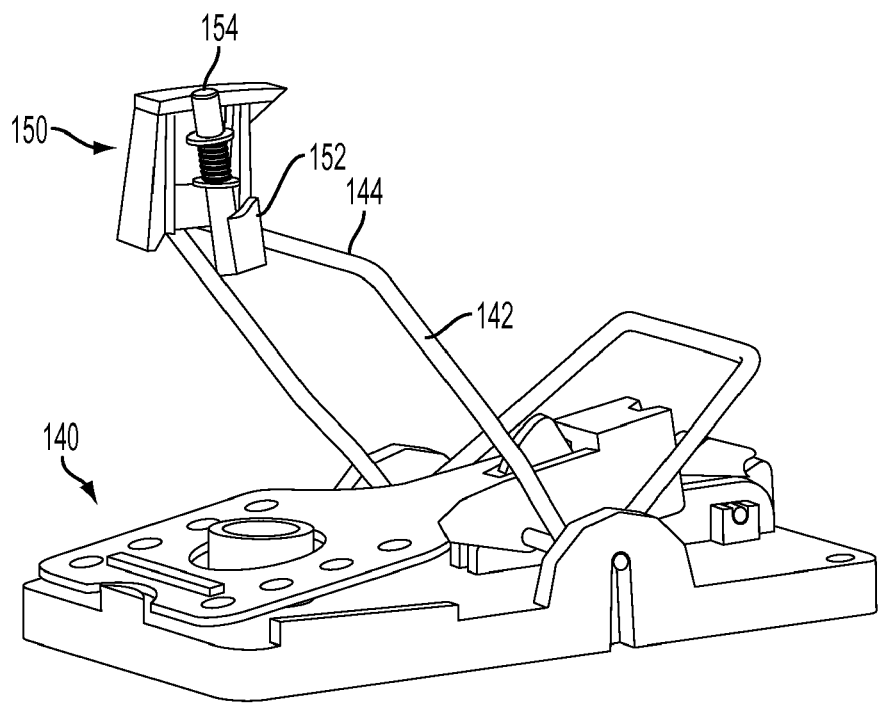
Figure 10A:
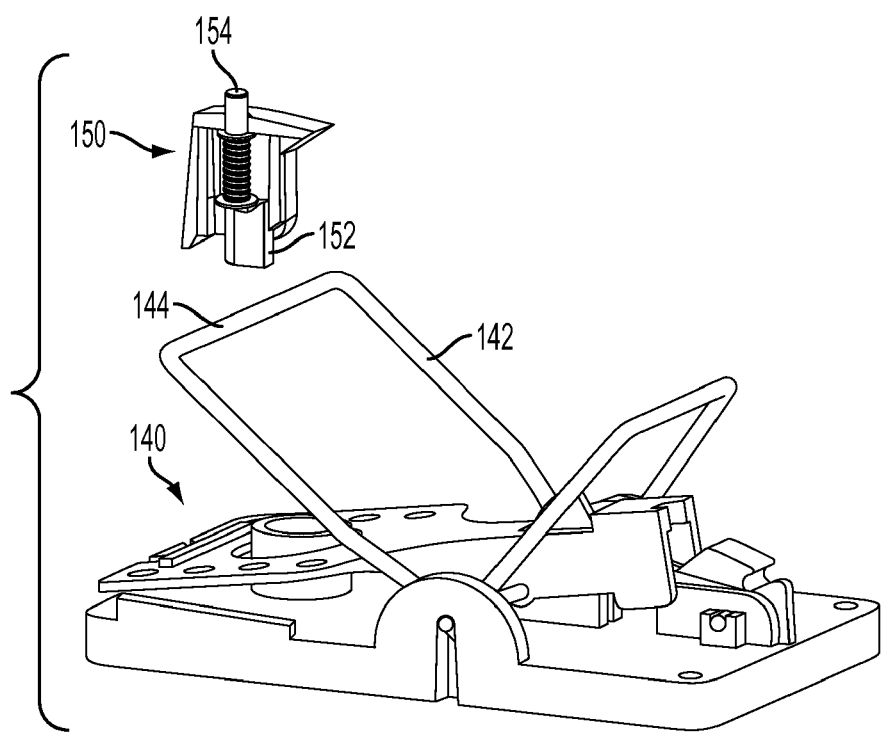
FIGS. 10a-10c are side elevation and perspective views of the rodent station of FIG. 1, showing an arm of a killing device in a third (partially activated) position.
Figure 10B:
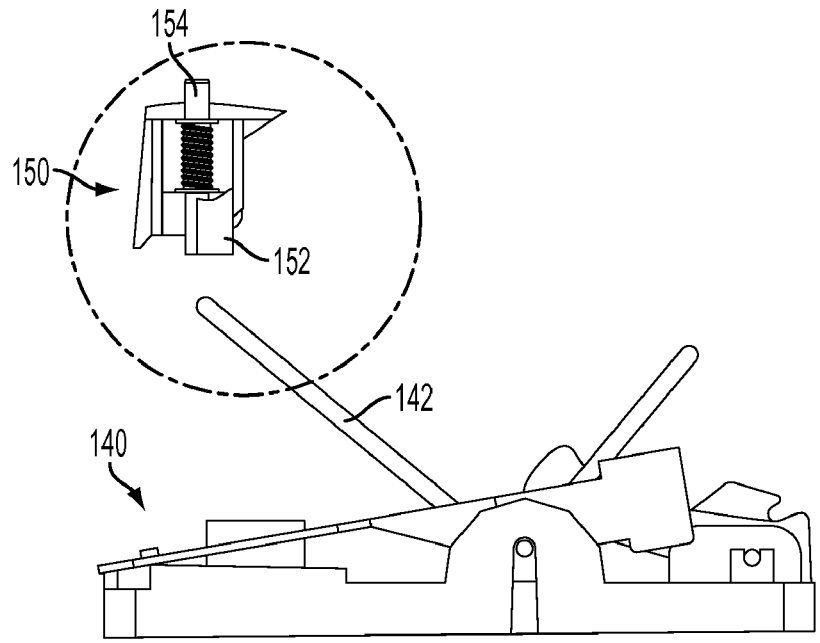
Figure 10C:
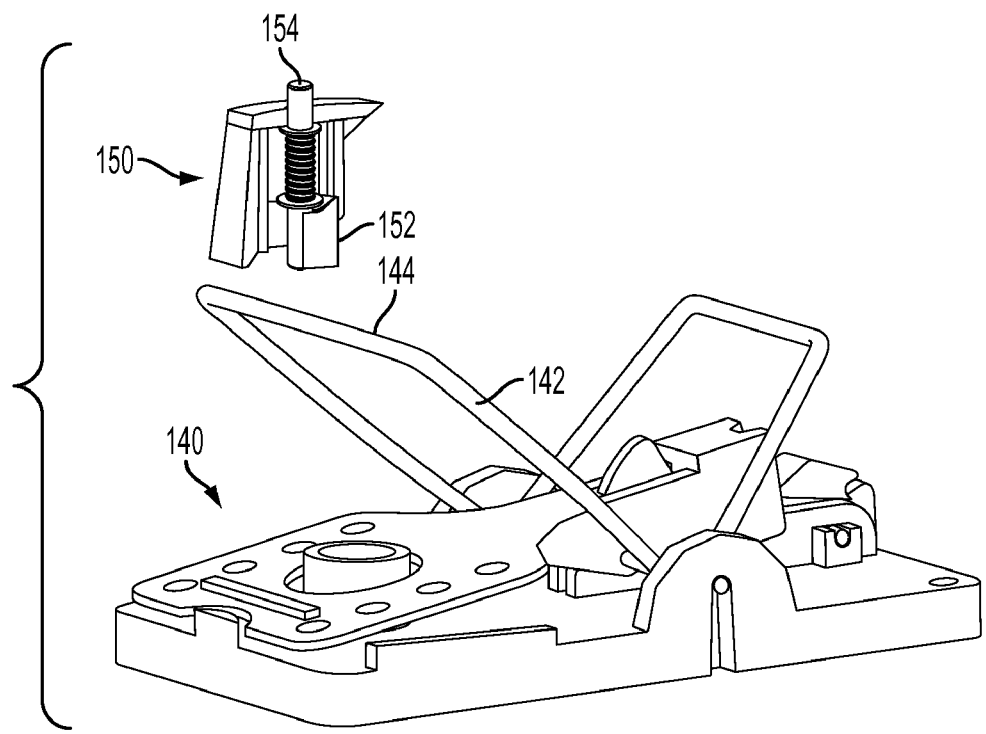

As shown in FIGS. 9b, 10b, 12 and 13, the retention mechanism may comprise a sloped surface 153 of the contact member 152 which cooperates with a sloped surface 155 disposed on an external wall of the indicator device 150 for a spring-loaded pop-up type design. As shown in FIG. 9b, in a first position that sloped surfaces 153 and 155 cooperate to hold a spring 157 in a compressed state. However, when the contact portion 144 of the arm 142 of the killing device 140 impacts the contact member 152, the sloped surface 153 of the contact member 152 is pushed beyond the end of the sloped surface 155, thereby permitting expansion of the spring 157, and protrusion of the alert portion 154 outside the rodent station (where it is visible to the PCO).

Figure 14:
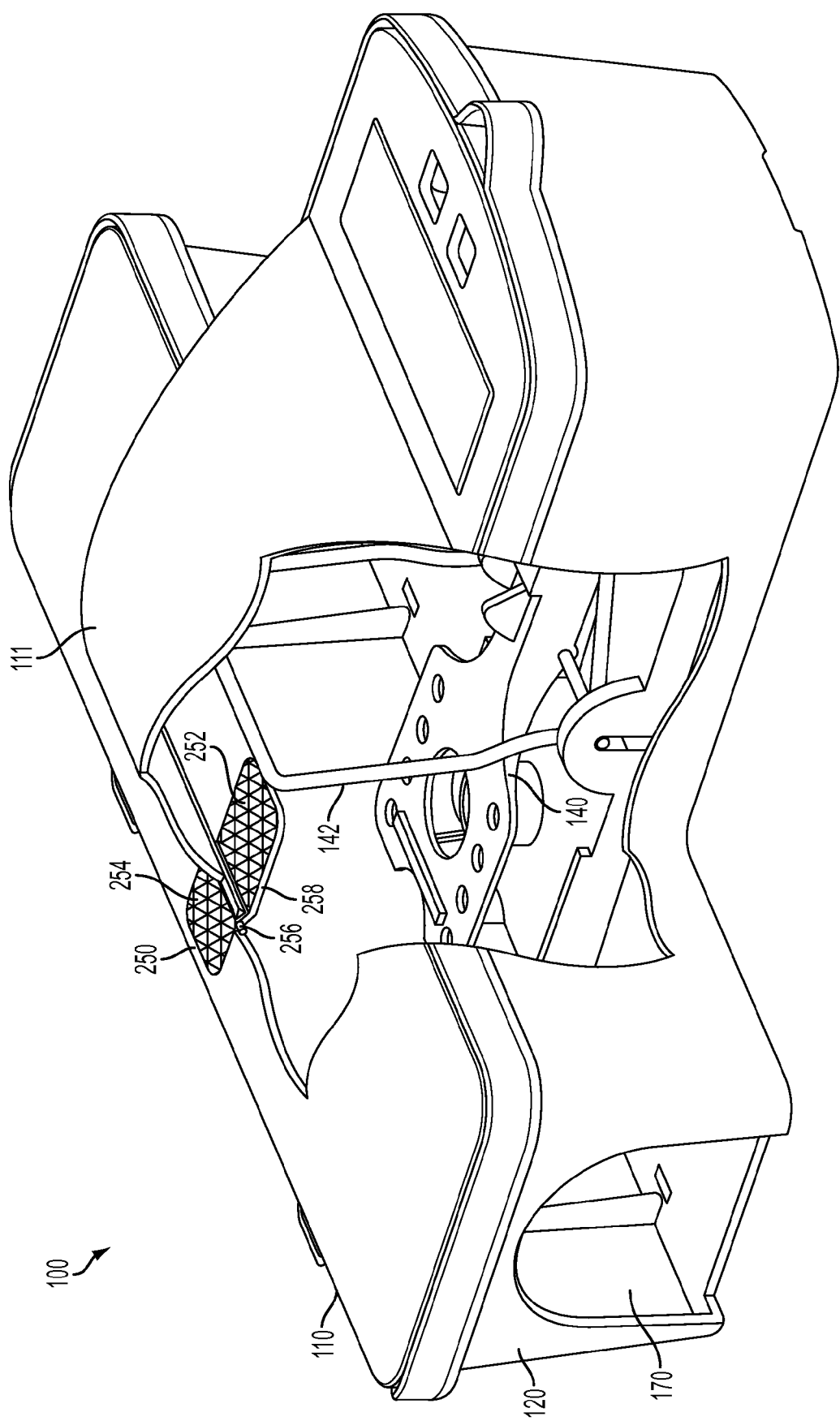
FIG. 14 is a perspective view of a rodent station according to another exemplary embodiment, showing an arm of a killing device in a first (un-activated) position.
Figure 15:
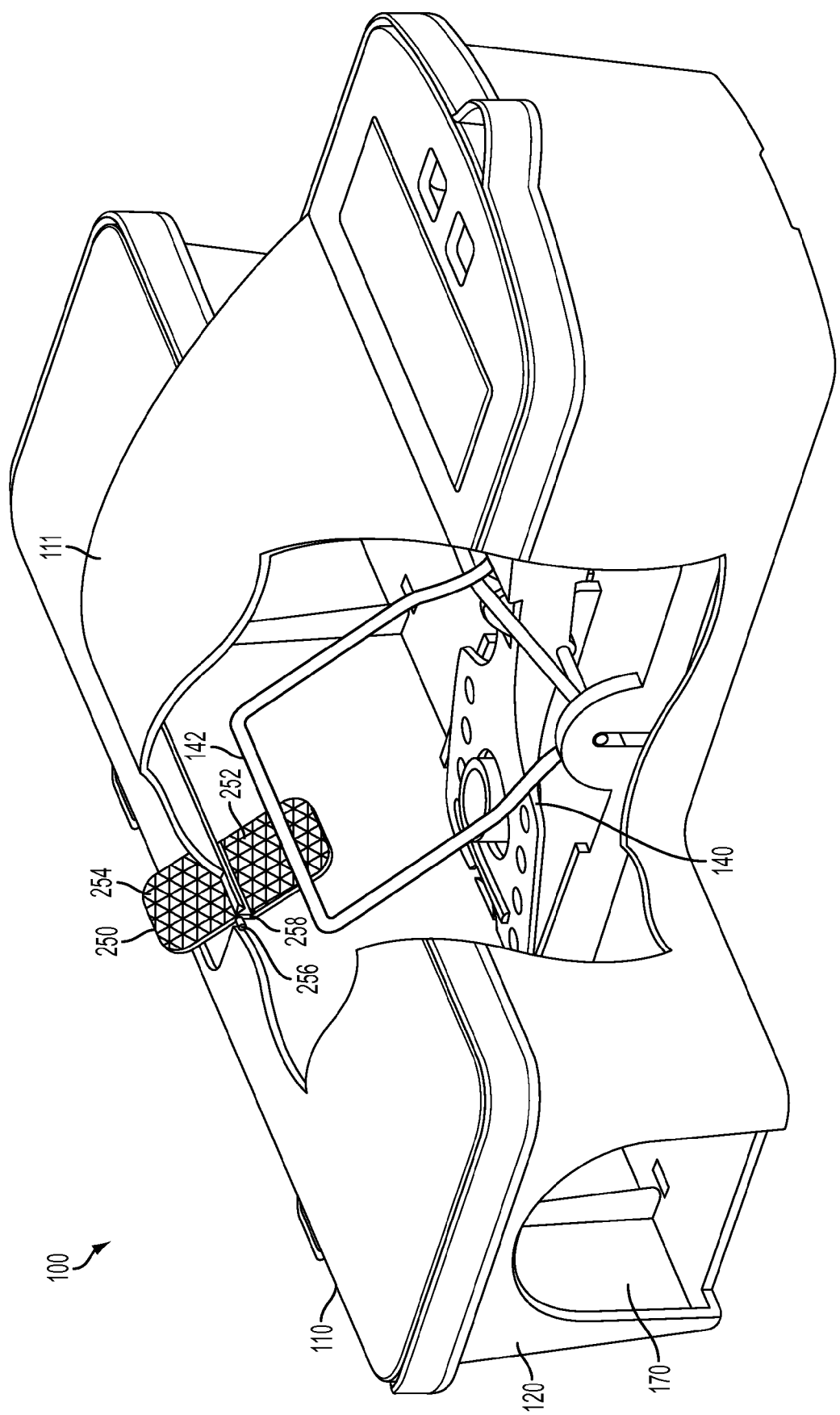
FIG. 15 is a perspective view of the rodent station of FIG. 14, showing an arm of a killing device in a second (partially activated) position.
Figure 16:
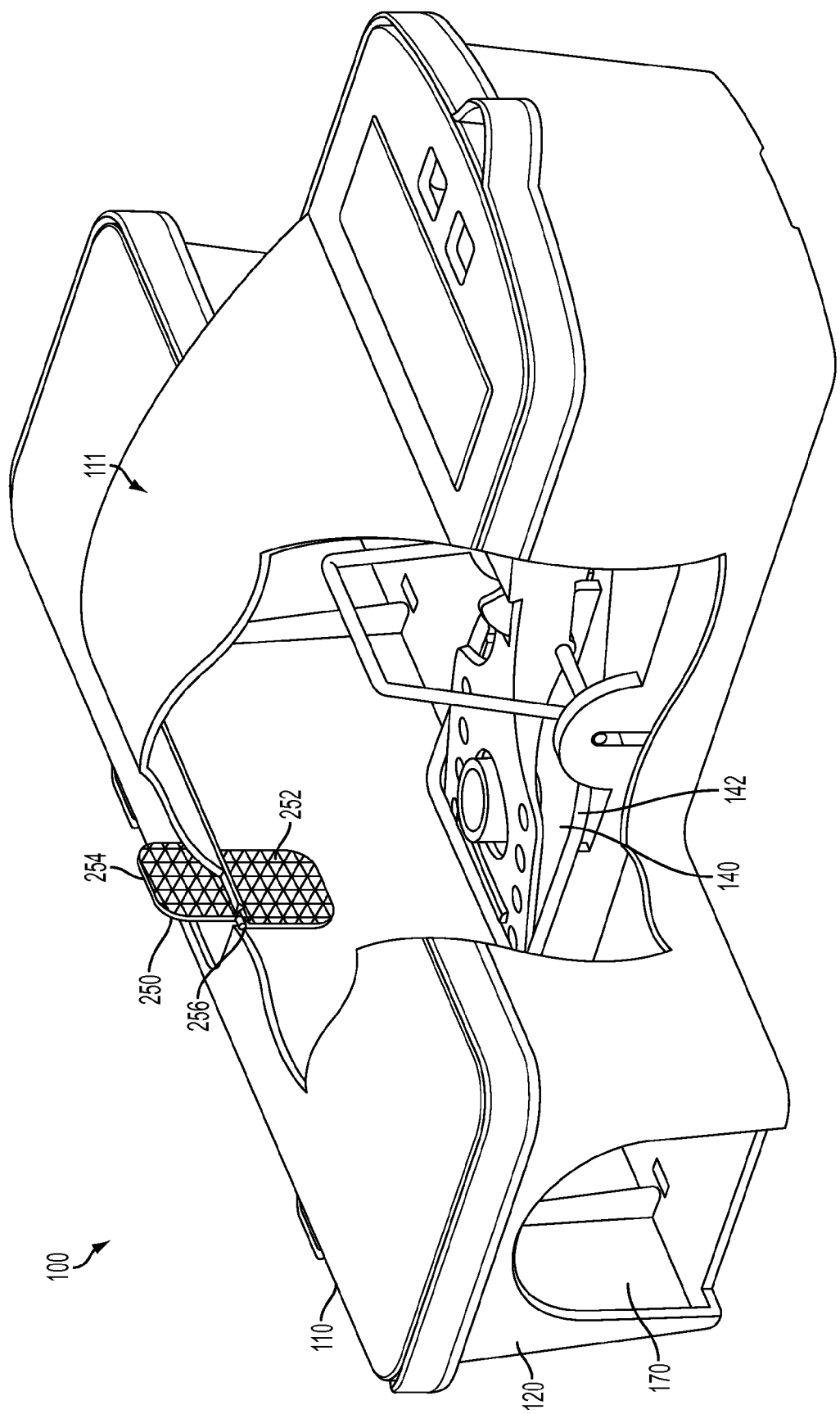
FIG. 16 is a perspective view of the rodent station of FIG. 14, showing an arm of a killing device in a third (fully activated) position.

Alternatively, and with reference to FIGS. 14-16, the indicator device may comprise a rotating flag device 250. For example, the rotating flag device 250 may be a substantially flat or L-shaped component that includes an alert portion 254 and a contact member 252 and that is mounted within a portion of the cover 110 of the rodent station 100. The alert portion 254 of the rotating flag device 250 may be fitted within a corresponding hole of the cover 110 so as to be initially disposed at a position flush with the cover 110 of the rodent station 100. As such, the alert portion 254 may be of the shape of the cover 110 at the position in which the alert portion 254 is fitted within the cover 110. The contact member 252 may extend beneath the cover 110. The rotating flag device 250 may be connected to the cover 110 via a pin 256 that extends widthwise through the rotating flag device 250 and that securely connects on either side within the cover 110. The rotating flag device 250 may loosely surround the pin 256, thereby allowing for the rotating flag device 250 to revolve or rotate about the pin 256. When the movement of the killing device 140 actuates the contact member 252 of the rotating flag device 250, the rotating flag device 250 will rotate around the pin 256, so that at the end of the rotation the alert portion 254 of the flag device is disposed above the cover 110 of the rodent station 100 (and visible to the PCO). While substantially flat or L-shaped, the rotating flag device 250 may include a stepped edge or stopper 258 at the rotating point (the pin 256) of the rotating flag device 250 to limit its rotation. The stopper 258 serves to contact a portion of the cover 110 during rotation of the rotating flag device 250, thereby preventing further rotation of the device 250 and causing alert portion 254 to be disposed in an upright or near upright position with respect to the cover 110.

According to an exemplary embodiment, the rotating flag device 250 may be substantially flat, and the cover 110 may include a dome-shaped portion 111 or other extending portion, providing space within the rodent station 100 for the arm 142 to rotate and contact the contact member 252 of the flat shaped rotating flag device 250. According to another exemplary embodiment, the rotating flag device 250 may be substantially L-shaped, in which case the cover need not include a dome shaped portion 111 or other extending portion as the contact member 252 extends downward in the rodent station 100 providing clearance for the arm 142 to contact the contact member 252.

FIG. 14 illustrates the arm 142 of the killing device 140 in a first (un-activated) position. At this point, the killing device 140 has not been triggered. FIG. 15 shows the arm 142 in a second (partially activated) position. At this point, the killing device 140 has been triggered, and the arm 142 is accordingly rotating to contact the contact member 252. FIG. 16 shows the arm 142 in a third (fully activated) position. At this position, the arm 142 has contacted the contact member 252, causing the rotating flag device 250 to rotate about the pin 256, resulting in the alert portion 254 rotating and being disposed above the cover 110, as well as stopped at an upright or near upright position by the stopper 258.

The killing device 140 of the rodent station may include an arm 142 which has a contact portion 144 for cooperating with the contact member 152, 252 on the indicator device 150, 250. For example, the arm 142 may include a U-shaped portion which extends beyond the remainder of the arm (as shown in the figures). Although the contact portion 144 of the killing device 140 is shown as a substantially U-shaped member in the figures, those of ordinary skill in the art will realize that the contact portion 144 may have various configurations. As discussed above, although the killing device 140 shown in the figures includes an arm 142 which rotates through an arc to activate the indicator device 150, 250, those of ordinary skill in the art will realize that other killing devices may be used in connection with the present disclosure, with corresponding modifications to the indicator device.

The rodent station 100 according to the above-described exemplary embodiments may be lockable by a key or other mechanism known to those of ordinary skill in the art. Locking of the rodent station 100 prevents unauthorized persons from accessing the killing device 140 or from activating the indicator device 150.

The rodent station 100 according to an embodiment may also include an area to place food or some attractant (e.g., food-type attractant) which is separate from the killing device 140. Further, as discussed above, the rodent station 100 may include separate entrance and exit openings 170 which are visible to the rodent (which is attractive to the rodent), and which permit the rodent to enter the station 100 from either side. Additionally, the rodent station 100 may include a separate compartment for the killing device which keeps the main body of the killing device 140 out of view of the rodent, as shown in the figures. For example, the separate compartment may be a portion of the base 120.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A rodent station comprising:
   a base including an entrance point and an exit point;
   a hinged cover coupled to the base;
   an indicator device housed within a portion of the cover; and
   a killing device removably disposed within the base, the killing device including an arm which, when triggered, activates the indicator device,
   wherein the indicator device and the killing device comprise separate and distinct members, so that various types of killing devices may be disposed within the base and still operate to actuate the indicator device; and
   wherein the indicator device is spring-loaded and includes a contact member and an alert portion, the alert portion being disposed within the rodent station and configured to protrude from the rodent station upon the indicator device being activated by the arm of the killing device.

2. The rodent station of claim 1, wherein the arm of the killing device is spring-loaded, such that when triggered the arm rotates from a first position to a second position thereby activating the indicator device.

3. The rodent station of claim 2, wherein the cover includes a substantially dome-shaped portion, and wherein the rotation of the arm follows a path of the substantially dome-shaped portion of the cover.

4. The rodent station of claim 1, wherein the arm of the killing device comprises a contact portion which is configured to contact the contact member of the indicator device upon the arm of the killing device being triggered, wherein such contact activates the indicator device.

5. The rodent station of claim 1, wherein the alert portion is of a substantially rectangular shape.

6. The rodent station of claim 1, further comprising a locking mechanism for securing the cover to the base.

7. The rodent station of claim 1, further comprising locating tabs formed on a bottom portion of the base for positioning the killing device within the rodent station.

8. The rodent station of claim 1, wherein the indicator device is removable from the cover.

9. A rodent station comprising: a base including an entrance point and an exit point; a hinged cover coupled to the base; an indicator device housed within a portion of the cover, the indicator device comprises a rotating flag device; and a killing device removably disposed within the base, the killing device including an arm which, when triggered, activates the indicator device, wherein the rotating flag device is substantially flat or L-shaped and is mounted on the cover, and wherein the rotating flag device may be disposed in a first position flush with the cover, or a second position protruding outside the cover, wherein the indicator device and the killing device comprise separate and distinct members, so that various types of killing devices may be disposed within the base and still operate to actuate the indicator device.

10. The rodent station of claim 9, wherein the rotating flag device comprises an alert portion, a contact member, and a pin extending widthwise through the rotating flag device that securely connects on either side within the cover, wherein the rotating flag device is rotatable about the pin to move between the first position and the second position.

11. The rodent station of claim 10, wherein the rotating flag device further comprises a stopper formed at the rotating point of the rotating flag device, the stopper configured to limit the rotation of the rotating flag device.

12. A rodent station comprising:
   a base comprising an entrance point and an exit point;
   a cover coupled to the base;
   a spring-loaded indicator device housed within a portion of the cover, wherein the indicator device includes a contact member and an alert portion; and
   a spring-loaded killing device removably disposed in the base and including a rotating arm which, when triggered, activates the spring-loaded indicator device;
   wherein the spring-loaded indicator device and the spring-loaded killing device comprise separate and distinct members, so that various types of spring-loaded killing devices may be disposed within the base and still operate to actuate the spring-loaded indicator device, and wherein activation of the spring-loaded indicator device causes the alert portion of the indicator device to extend outwardly from the cover.

13. The rodent station of claim 12, wherein the spring-loaded indicator device further includes a spring connecting the contact member and the alert portion, and a retention mechanism configured to hold the spring in a compressed state.

14. The rodent station of claim 13, wherein the contact member is configured to move upon contacting the rotating arm to displace the retention mechanism and expand the spring, thereby disposing the alert portion outside the cover of the rodent station.

15. The rodent station of claim 13, wherein the retention mechanism comprises a sloped surface formed in the contact member which cooperates with a sloped surface formed in a wall of the indicator device.

16. The rodent station of claim 12, wherein the contact member of the spring-loaded indicator device comprises a mechanical switch.

17. The rodent station of claim 12, further comprising a locking mechanism for securing the cover to the base.

18. The rodent station of claim 12, further comprising locating tabs formed on a bottom portion of the base for positioning the killing device within the rodent station.

19. A method for monitoring rodent activity comprising the steps of: disposing a rodent trap including at least one killing device and at least one indicator device in a rodent-infested area; periodically observing the indicator device to determine if rodent activity has occurred; continuing to observe the indicator device if the indicator device is disposed in a first position; and, checking the rodent device if the indicator device is disposed in a second position, wherein the indicator device and the killing device comprise separate and distinct members, so that various types of killing devices may be disposed within the base and still operate to actuate the indicator device; and wherein the at least one indicator device comprises a spring-loaded device, and wherein the indicator device includes an alert portion which is disposed internally of the rodent trap when the indicator device is disposed in the first position, and disposed externally of the rodent trap when the indicator device is disposed in a second position.

* * * * *